INVENTORS.
JIMMIE L. HUITT
JAMES E. KNIZNER
NICHOLAS MARUSOV

Nov. 19, 1968   J. L. HUITT ET AL   3,411,307
METHOD AND APPARATUS FOR BURYING OFFSHORE PIPELINES
Filed Nov. 23, 1966   2 Sheets-Sheet 2

INVENTORS.
JIMMIE L. HUITT
JAMES E. KNIZNER
NICHOLAS MARUSOV

3,411,307
METHOD AND APPARATUS FOR BURYING OFFSHORE PIPELINES

Jimmie L. Huitt, Glenshaw, and James E. Knizner and Nicholas Marusov, Verona, Pa., assignors to Gulf Research & Development Company, Pittsburgh, Pa., a corporation of Delaware
Filed Nov. 23, 1966, Ser. No. 596,494
8 Claims. (Cl. 61—72.4)

ABSTRACT OF THE DISCLOSURE

The invention comprises methods and apparatus to bury offshore pipelines with the use of moveable vibrating means which are selectively, rigidly fixed with respect to the pipeline. Because of the thixotropic nature of the underwater mud, the vibration permits the pipeline to fall by gravity through the liquefied mud to thereby bury itself.

---

Figure 1:
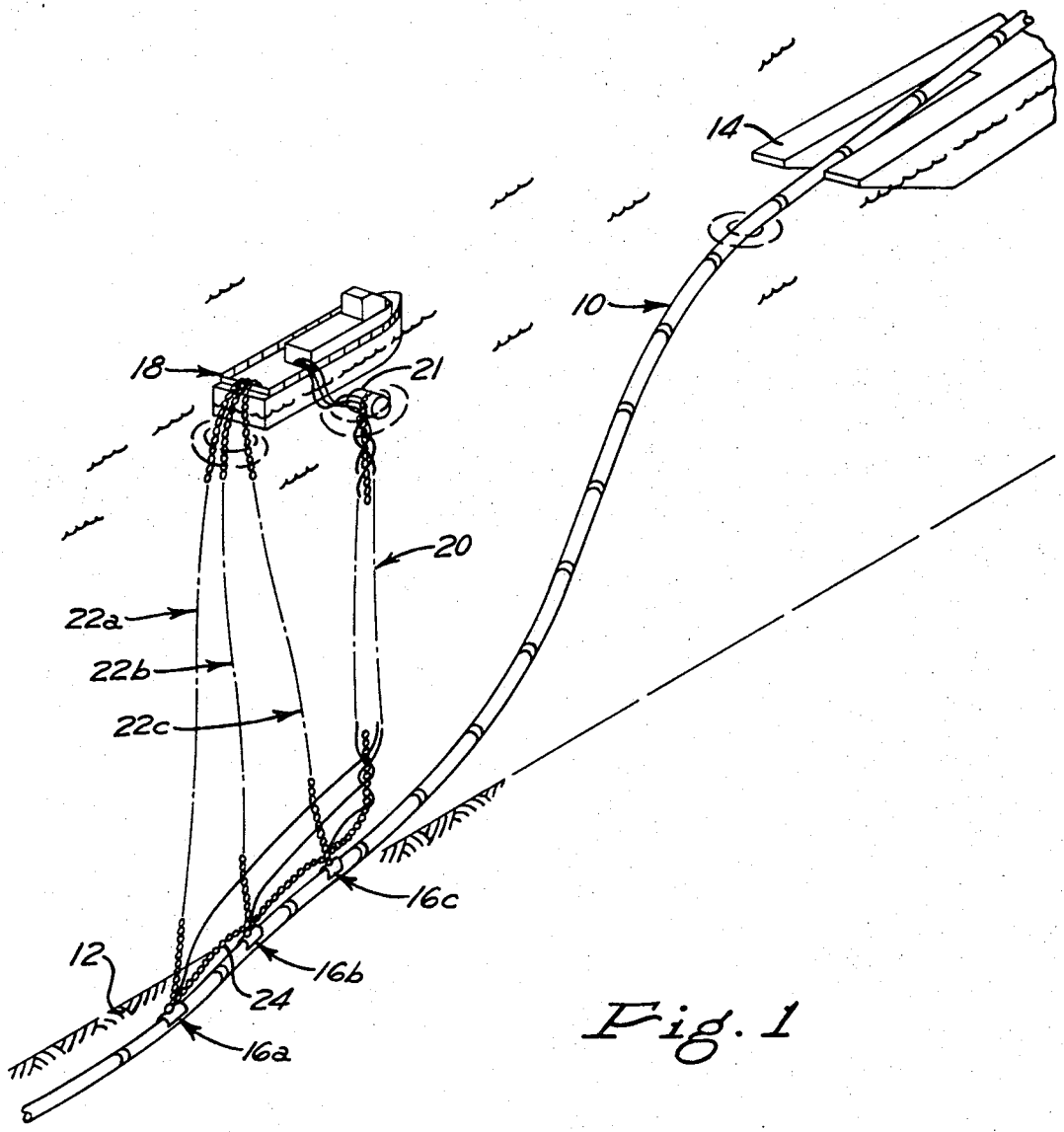

This invention relates to methods and apparatuses for burying offshore fluid carrying pipelines in sedimentary deposits by means of vibrating the pipeline to thereby cause it to bury itself.

Heretofore, offshore pipelines have been most commonly buried by a method which comprised digging a trench, laying the pipeline in the trench, and then waiting for natural shifts due to wave currents and the like to cause the mud to fill the trench and bury the pipeline. This method is undesirable because of the expense of digging the trench, and also because the pipe is left exposed during the time natural forces are covering it over. The pipe could rise out of the trench while it is in the process of being buried.

Three common types of ditch forming means are: the clam shell bucket; drag line bucket, and high-velocity jets operating just ahead of the moving contact area between the pipeline and the mud. The clam shell and drag line bucket methods are expensive. The power unit is mounted on a large barge and requires substantial supporting personnel including operators, maintenance crew for the power unit, maintenance and operating crew for the barge and tugboat, and dining and sleeping facilities for these personnel plus the supporting personnel. The jetting method is also expensive, has the same disadvantages as the clam shell bucket method above, and additionally the disadvantage that since the jets operate very close to the pipeline and the jet stream is of very high velocity, there is a considerable danger of damaging the weight coating on the pipe.

It is known that offshore muds, as opposed to sand, gravel or shell and water mixtures, are of a thixotropic nature, that is, the mud, which is usually in a semisolid or gel condition, physically changes to behave as a liquid when subjected to vibration or agitation. The characteristic of the mud which changes is its yield shear strength. The principle of operation of the present invention is to cause the pipeline to vibrate as it comes into contact with the mud. This vibration causes the mud in the immediate vicinity of the pipeline to change to behave more as a liquid which permits the pipeline to sink. The pipeline will continue to sink until it hits "bottom" or until the vibration is stopped. The term "bottom" refers to a rock layer or a layer of very dense mud. This thixotropic phenomenon is by nature reversible, and is thought of as a "rebound" type of phenomenon. That is, as soon as the driving force, the vibration, is relieved, the mud begins to return to its more solid condition having a relatively higher yield shear strength, and will thus hold the pipeline in position under the mud. The overburden is present on the pipeline as soon as the pipeline is buried, and is more and more effective to hold the pipeline in place as the mud continues to rebond. The pipeline will remain in place even when carrying gas because of the strong rebonded overburden. The pipeline is weighted in the usual fashion, if required, by means of a concrete or asphaltic coating. The invention requires that the pipeline and contents be heavier than the mud, and the favorable weight condition is enhanced by the weight of the vibrator itself. The favorable weight relationship can be still further enhanced by filling the weighted pipeline with water during sinking.

An important advantage of the present invention is that the trench heretofore required need not be dug, and the job of burying offshore pipeline is made more economical. Another disadvantage of prior methods is that it is possible for the pipeline to miss the trench during laying. In the present invention the pipeline makes its own "trench" as it sinks.

Figure 2:
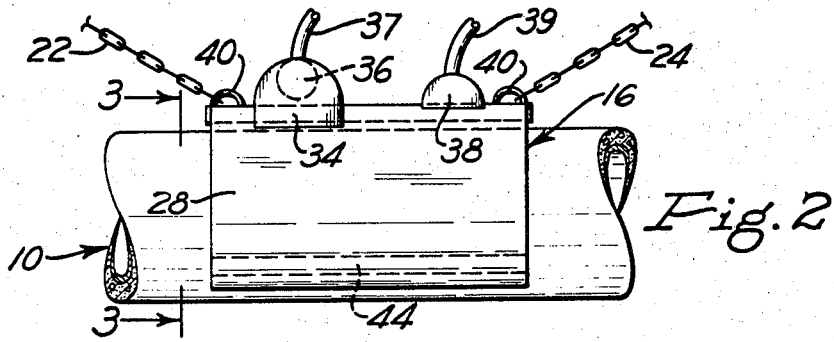
Figure 3:
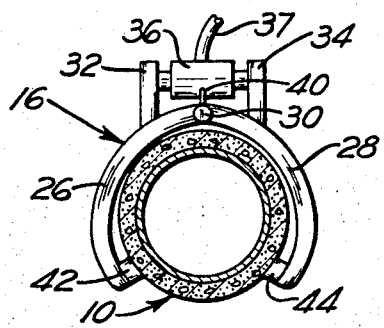
Figure 4:
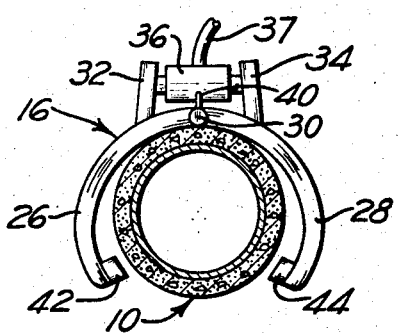
Figure 6:
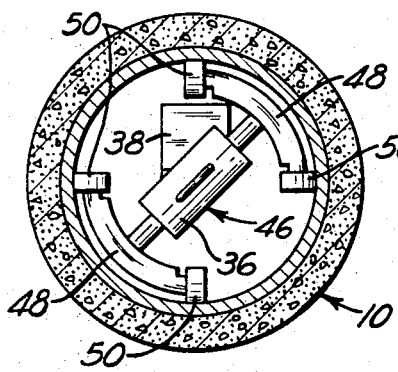
Figure 5:
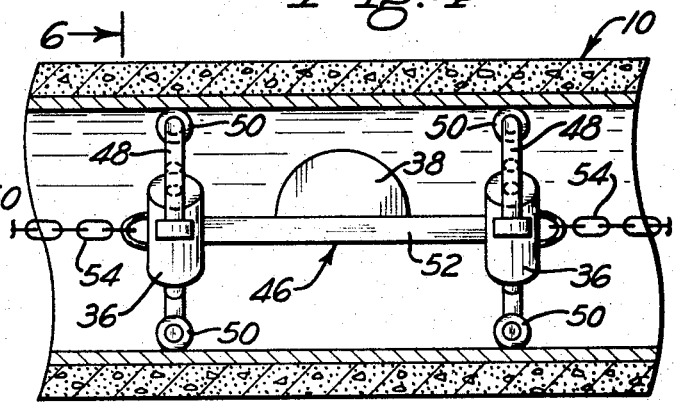
Figure 7:
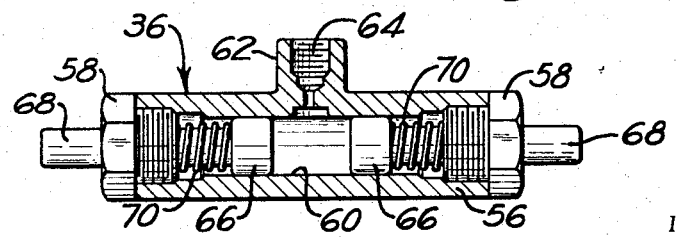

In the accompanying drawing forming a part of this disclosure: FIG. 1 is a prospective view of an offshore pipeline laying operation embodying the method of this invention; FIG. 2 is a side elevational view of a section of the pipeline showing the vibrator in place; FIG. 3 is a cross-sectional view taken on line 3—3 of FIG. 2; FIG. 4 is a view similar to FIG. 3 showing the pipeline grasping means in the released condition; FIG. 5 is a longitudinal cross-sectional view of a section of a pipeline carrying a modified vibrating means; FIG. 6 is a cross-sectional view taken on line 6—6 of FIG. 5; and FIG. 7 is a longitudinal cross-sectional view of the ram used in the apparatuses of both embodiments of the invention shown.

Referring now in detail to the drawing, 10 designates a pipeline in the process of being laid in an underwater sedimentary deposit 12 from a conventional lay barge 14. Mounted on pipe 10 are three vibrating means 16a, 16b, and 16c. Three vibrators are shown by way of example only. More or fewer would be used depending on the size of the pipeline and the nature of the mud on a particular job. As shown in FIG. 1, vibrator 16a has caused the section of the pipeline with which it is associated to sink in formation 12 almost to the desired level and will be slid along the pipe toward vibrator 15b shortly. Vibrator 16b is just beginning to sink its section of the pipeline, and vibrator 16c is associated with a section of the pipeline which has not yet reached the surface of the sedimentary formation. The vibrators 16 are operated from a crew boat 18 which supplies the air pressure, or electrical energy, and the pulling force for the vibrators. The vibrators 16 are joined to the crew boat 18 by means of a common utility cable 20 having branch leads leading to each vibrator, and also by individual chains 22a, 22b and 22c connected directly to each vibrator and to winches on board crew boat 18. Common cable 20 carries a buoy 21 to keep the cable from fouling on any of the pipeline laying apparatus on the barge.

The three vibrators are also joined together by a chain 24. By pulling chain 22c from the crew boat, the three vibrators will move simultaneously by way of chain 24. The distance between the vibrators and the nature of the mud controls the angle and the bending curvature at which the pipe will sink, and the length of chain 24 is predetermined according to the nature of the particular formation. Chains 22a and 22b can be used in addition to chain 24 to shorten the distance between any two vibrators if an anomaly should be struck, or these three chains can be used in place of chain 24 where the characteristics of the mud are discontinuous throughout, and more precise control of the positions of the vibrators is required.

Referring to FIGS. 2 through 4, each of the three vibrators are the same, and each comprises a pair of tong-like members 26 and 28 joined together at a pivot point 30. Each member 26 and 28 comprises an upstanding lug 32 and 34, respectively, positioned on either side of the pivot 30. Mounted between the lugs 32 and 34 is a pneumatic locking cylinder 36 carrying an air supply pipe 37. Positioned rearwardly of lugs 32 and 34 on vibrator 16 is a vibrating means 38, of any suitable type, carrying a utility supply line 39 to supply air, electricity, or whatever energy source the vibrator requires. The vibrating means is mounted on any convenient part of the vibrator. Vibrator 16 carries an anchor point 40 at each end for attachment of chains 22 and 24.

At the outer end of each tong arm 26 and 28 is a grasping lug 42 and 44 respectively. Lugs 42 and 44 are replaceable, and serve to accommodate vibrators 16 to various sizes of pipeline up the maximum capacity of the vibrator. In FIG. 3, the vibrator is locked in place and the vibrating means 38 are operating to sink the pipeline. In FIG. 4, the locking cylinder 36 has been deactuated to open the tongs. The proper selection of sizes for lugs 42 and 44 causes the vibrator 16 to be slidably mounted on the pipeline when the tong arms 26 and 28 are opened. That is, lugs 42 and 44 create a condition wherein the space between the tong arms in the open position is always less than the outside diameter of the pipeline. Thus, when the vibrating means is not operating and the tongs are open, the vibrator can be moved along the pipeline by means of the chains but cannot come off the pipeline, and when the vibrating means are operating the tongs are closed on the pipeline to make a rigid structure.

Referring to FIGS. 5 and 6, there is shown a second embodiment 46 of the vibrator. Vibrator 46 is in the form of a trolley which rides inside pipeline 10. Trolley 46 comprises a pair of end assemblies, each comprising a pair of arcuate members 48, each having a wheel 50 at each end. Members 48 are connected at their midpoints by pneumatic locking cylinder 36. The two end assemblies are joined by a cross piece 52 which carries the vibrating means 38 at its midpoint. Suitable means are provided to permit trolley 46 to roll free in the pipe when the locking cylinders 36 are deactuated, and to hold the trolley 46 in fixed position in the pipeline when the cylinders are actuated. These means may conveniently comprise spring loaded axles, not shown, for each wheel 50, or may comprise an offset wheel arrangement to cause the end assemblies of the trolley 46 to wedge in position upon actuation of the locking cylinders. A chain 54, similar to chain 24, is provided to cause the trolleys to move together. Suitable supply lines for the vibrators and locking cylinders are provided, but are not shown for the sake of clarity. The chain and supply line is fed through each additional length of pipe as it is added to the pipeline on the lay barge 14, by conventional equipment presently in use, as will be clear to one skilled in this art.

The pipeline must be heavier than the mud in order for the method of the invention to operate. The usual weight coated pipeline has a lower specific gravity than the usual muds. The specific gravity of such pipelines is increased by filling the pipeline with water during sinking to make it heavier than the mud. Further increased pipeline weight is desirable for increased speed, and this is inherently obtained due to the weight of the vibrator.

Referring to FIG. 7, there is shown a cross-sectional view of the locking cylinder 36 used in both embodiments. Locking cylinder 36 comprises an elongated hollow cylindrical body 56 provided with a pair of piston rod sealing end caps 58. Cylinder body 56 is formed with a central pneumatic cylinder portion 60 between end caps 58. Body 56 is formed with an upstanding boss 62 formed with a central air supply opening 64 leading to pneumatic cylinder portion 60. Slidably mounted in cylinder portion 60, in facing relation to each other, are a pair of piston members 66. Each piston member 66 carries a piston rod 68 extending outwardly and passing through sealing end cap 58. Means are provided to normally urge the piston members 66 and piston rods 68 towards each other, and may comprise a compression spring 70 mounted between the outside surface of each piston member 66 and the inside surface of each end cap 58. It will be understood that the lugs 42, 44 of vibrator 16 are joined to the outer ends of piston rods 68 in vibrator 16, and the arcuate members 48 are joined to the outer ends of said rods in the second embodiment of the invention. In both embodiments, the vibrator is fixed with respect to the pipeline when air pressure is supplied through supply passage 64 to urge the pistons 66 away from each other; and the vibrator is free to move axially only of the pipeline when the air pressure is released and springs 70 urge the pistons 66 towards each other.

Any suitable vibrating means may be used for vibrating means 38. Many different types of vibrating means are presently available. For example, the vibrating means could comprise a pneumatically operated oscillating piston. Such a piston is manufactured by Cleveland Vibrator Company of 2828 Clinton Ave., Cleveland 13, Ohio, is described in their CVC catalogue number 109, dated Feb. 1, 1963, at pages 8 and 9, and is identified by their type T and LST. Another type of suitable vibrating means is a pneumatically operated eccentric sphere. Such a device is manufactured by Martin Engineering Company, of Neponset, Ill., is described in their Vibrolator catalogue, copyright 1963, at pages 2 and 3, and is identified at their UCV series. Still another type of vibrating means is an electric motor carrying a pair of eccentrically mounted weights. Such a device is manufactured by the same Cleveland Vibrator Company above, is described in their RC31 Spec. Sheet 7, 1OM63, dated 1963, and is identified by their model number RC–31.

Laboratory tests were conducted with scale model pipelines in actual sediment samples obtained from a pipeline right-of-way in the Gulf of Mexico. This mud had a specific gravity of 1.53 and a shear strength of 32 lb./ft., and is typical of the harder muds encountered in pipeline laying operations. Softer muds, that is, muds having less shear strength and a lower specific gravity, are easier to sink a pipeline into using the method of the invention. Thus, the tests were run using a mud typical of the more difficult conditions one can expect to encounter in actual use. The pipe models were made of ¼ in. diameter plastic tube that had steel balls pressed into the ends to seal the models and to add weight. Different lengths of pipe were used to get different specific gravities. The mud was placed in a container and the pipe models were placed on the surface of the mud. The entire assembly was vibrated at 60 cycles per second at various vibration amplitudes. The vibration amplitudes of the models themselves were something less than the amplitudes applied to the test apparatus since the models moved with respect to the mud because of their own inertia. In the following table, the first two figures under each test give the vibration amplitude applied, in thousandths of an inch peak to peak, and the time duration of the test. The diameters sunk measurements were made from the surface of the mud to the uppermost part of the model.

| Specific Gravity of Pipelines | Diameters Sunk | | |
|---|---|---|---|
| | Test No. 1 | Test No. 2 | Test No. 3 |
| | 5.6 mils, 20 minutes | 9.3 mils, 20 minutes | 13.4 mils, 10 minutes |
| 1.84 | ¼ | ½ | 1½ |
| 1.94 | ¼ | ½ | 1¾ |
| 1.96 | ½ | ⅔ | 2 |
| 2.12 | ½ | ⅔ | 2 |
| 2.13 | ¾ | ⅞ | 2¼ |

From these data it can be seen that as the differential between the specific gravity of the pipeline and the specific gravity of the mud increases, the rate at which the pipeline sinks increases. Also, it can be seen that as the amplitude of vibration increases, the pipeline sinks faster.

Test No. 3 has the closest relationship to an actual situation in that the pipeline was buried to about 2 pipeline diameters in a relatively short time, 10 minutes. The specific gravities in the left hand column are typical pipeline specific gravities encountered in actual use. In actual use, it is desired to have about three feet of cover over the pipeline, except closely adjacent the shore and the platform where additional cover is desirable, and since a large percentage of actual pipeline diameters are in the neighborhood of two feet, two pipeline diameters would be more than sufficient. The time of 10 minutes to sink the model in test No. 3 is also very conservative in that in actual practice the time allowed to sink a pipeline section would equal the time necessary to make a joint times the number of vibrating means being used. This is so because any one section of pipeline is operated upon by all of the vibrating means being used in succession, as these vibrating means are slid along the pipeline during the sinking operation, as explained above. Also, the amplitudes used are highly conservative, since it is estimated that in actual practice, the pipeline can be vibrated with an amplitude up to ⅜ to ½ inch peak to peak.

While the invention has been described in some detail above, it is to be understood that this detailed description is by way of example only, and the protection granted is to be limited only within the spirit of the invention and the scope of the following claims.

We claim:

1. A method of burying a pipeline in an underwater thixotropic formation, comprising the steps of weighting the pipeline so that its specific gravity is greater than the specific gravity of the formation, feeding the pipeline from the surface of the water over the formation through the water and down onto the surface of the formation, vibrating a plurality of portions of the pipeline in contact with the formation with a plurality of individual vibrating means in rigid connection with the pipeline to cause the pipeline to bury itself in the formation, and moving each of said plurality of vibrating means along the pipeline from a vessel at the surface of the water over the formation to control the degree of bending of the pipeline as it is buried.

2. The method of claim 1, and moving the vibrating means along the pipeline as additional lengths of pipe are added to the pipeline on the lay barge to continuously bury the pipeline as it is fed off of the lay barge.

3. Apparatus for burying a pipeline in a thixotropic formation comprising means to selectively rigidly fix and release the apparatus with respect to the pipeline, vibrating means to cause a portion of said pipeline to vibrate when said fixing and releasing means are in rigid fixed position with respect to said pipeline, and means to limit the motion of said apparatus with respect to said pipeline to motion axially of said pipeline.

4. The combination of claim 3, said fixing and releasing means comprising a pair of tong-like elements, hinge means to pivotally mount said tong-like elements together, and said fixing and releasing means comprising pneumatically operating piston means to move said tong-like elements pivotally about said hinge means.

5. The combination of claim 3, said apparatus comprising a roller trolley adapted to roll through the inside of said pipeline carrying said vibrating means, said fixing and releasing means comprising pneumatically operated double acting cylinder means adapted to permit rolling motion of said trolley within said pipeline in the released position thereof and adapted to prevent rolling motion of said trolley within said pipeline in the fixed position thereof.

6. Apparatus to bury a pipeline in an underwater thixotropic formation, the combination comprising a boat operable on the surface of the water, a moveable vibrating assembly on the pipeline, means to attach said vibrating assembly to said boat to permit said boat to move said vibrating assembly axially of said pipeline, said vibrating assembly comprising means to rigidly fix said assembly with respect to said pipeline and to release said assembly with respect to said pipeline for axial motion of said assembly with respect to said pipeline, and means to connect said fixing and releasing means on said assembly to said boat for operation of said fixing and releasing means on board said boat.

7. Apparatus for burying a pipeline in an underwater thixotropic formation which has been fabricated from individual sections of pipe on board a lay barge and laid out from the lay barge, said apparatus comprising a vibrating assembly moveable within said pipeline, draw means connected to said vibrating assembly and passing through said pipeline to the lay barge, whereby by drawing on said draw means said vibrating assembly may be moved within said pipeline toward said lay barge; said vibrating assembly comprising means to selectively rigidly fix said vibrating assembly with respect to said pipeline and to release said vibrating assembly for axial motion of said vibrating assembly with respect to said pipeline.

8. The combination of claim 7, said vibrating assembly comprising a roller trolley adapted to roll through the inside of said pipeline, and said releasing and fixing means comprising pneumatically operated double acting cylinder means selectively operable to lock and release the wheels of said roller trolley.

References Cited

UNITED STATES PATENTS

| 2,910,835 | 11/1959 | Timothy | 61—72.3 |
|---|---|---|---|
| 3,222,876 | 12/1965 | Harmstorf | 61—72.4 |
| 3,256,695 | 6/1966 | Bodine | 61—72.4 X |
| 3,347,054 | 10/1967 | Sherrod | 61—72.4 |

FOREIGN PATENTS 1,372,743   8/1964   France.

EARL J. WITMER, *Primary Examiner.*